US008869692B2

(12) United States Patent
Van Der Avoort et al.

(10) Patent No.: US 8,869,692 B2
(45) Date of Patent: Oct. 28, 2014

(54) TRANSPORT TABLE AND METHOD FOR THE USE THEREOF

(75) Inventors: Cornelius Adrianus Henricus Van Der Avoort, Chaam (NL); Robbert Hilmar Backer, Waalre (NL); Cornelius Petrus Du Pau, Eindhoven (NL); Marcel Peeren, Son en Breugel (NL)

(73) Assignee: OTB Solar B.V., Eindhoven (NL)

( * ) Notice: Subject to any disclaimer, the term of this patent is extended or adjusted under 35 U.S.C. 154(b) by 938 days.

(21) Appl. No.: 12/997,505

(22) PCT Filed: Jun. 11, 2009

(86) PCT No.: PCT/NL2009/050326
§ 371 (c)(1),
(2), (4) Date: Mar. 24, 2011

(87) PCT Pub. No.: WO2009/151326
PCT Pub. Date: Dec. 17, 2009

(65) Prior Publication Data
US 2011/0185930 A1    Aug. 4, 2011

(30) Foreign Application Priority Data
Jun. 11, 2008 (NL) .................................... 2001673

(51) Int. Cl.
B05C 17/06   (2006.01)
B05C 17/08   (2006.01)
B41L 13/00   (2006.01)
B65G 35/04   (2006.01)

(52) U.S. Cl.
CPC .................................... B65G 35/04 (2013.01)
USPC ..................... 101/126; 101/474; 198/339.1

(58) Field of Classification Search
USPC ............... 101/126, 407.1, 474, 483; 198/618, 198/339.1
See application file for complete search history.

(56) References Cited

U.S. PATENT DOCUMENTS 6,199,789 B1 *  3/2001  Marco ......................... 242/533.7
8,460,730 B2 *  6/2013  Teeuwen ....................... 426/389
(Continued)

FOREIGN PATENT DOCUMENTS

EP      0157991 A1    10/1985
FR      2537952 A1    6/1984
(Continued)

OTHER PUBLICATIONS

International Search Report for PCT International Patent Application No. PCT/NL2009/050326, mailed Oct. 27, 2009.

*Primary Examiner* — Leslie J Evanisko
*Assistant Examiner* — Marissa Ferguson Samreth
(74) *Attorney, Agent, or Firm* — Pillsbury Winthrop Shaw Pittman, LLP

(57) ABSTRACT

A transport table, comprising a transport web; an unwinding roller for unwinding the transport web therefrom; a first return element; a second return element; a winding roller for winding thereon the unwound transport web; a first frame with which the first and the second return element are connected; and a second frame with which the unwinding roller and the winding roller are rotatably connected, wherein the unwinding roller, the winding roller and the return elements together are designed for stretching the transport web such that between the first and the second return element a surface of the transport web is available as transport surface, and wherein the second frame is movable along a path substantially parallel to said transport surface with respect to the first frame. The invention also discloses a method for the use of the transport table.

16 Claims, 6 Drawing Sheets

(56) References Cited

U.S. PATENT DOCUMENTS

2005/0183932 A1* 8/2005 Angleitner .................. 198/618
2008/0034990 A1 2/2008 Hilpert et al.

FOREIGN PATENT DOCUMENTS

FR 2694274 A1 2/1994
GB 2157193 A 10/1985

* cited by examiner

TRANSPORT TABLE AND METHOD FOR THE USE THEREOF

This application is the National Phase of PCT/NL2009/050326, filed Jun. 11, 2009, which claims priority to Netherlands application 2001673, filed Jun. 11, 2008, the entire contents of both applications being incorporated herein by reference in their entireties.

The present disclosure relates to a transport table for transporting an object with the aid of a transport web, which transport table can be utilized in, inter alia, a screen print apparatus, for transporting substrates.

Screen printing, also called serigraphy, is a printing technique which, besides for decoration of fabric, is also applied industrially for the manufacture of printing plates and solar cells. The printing process involves spreading printing ink, often in the form of a paste-like liquid or paste, with the aid of a doctor blade over a locally transmissive printing template. In concept, the printing template is a gauze, i.e. a woven with mazes, of which some are sealed to stop printing ink during the printing process. At the location where the printing ink is pressed through the open mazes of the template and reaches the substrate located below the template, depiction on the substrate of the image contained in the template takes place.

In industrial settings, where a high feed-through capacity is important, for the purpose of semi-continuous supply and discharge of substrates to/from a screen printing station, often, a transport web is used. The transport web engages a side of the substrate that is not printed, and can thus discharge the substrate easily after printing. Here, a complicating factor is that a part of the transport web on which the substrate rests during printing is susceptible to damage when used repeatedly and can become polluted through printing ink inadvertently applied thereon. In particular when fragile substrates such as thin glass sheets or solar cells are used, there is the risk of a substrate breaking during the screen printing process. After removal of the broken substrate, substrate splinters and printing ink can remain behind on the transport web, presenting the risk that substrates to be printed afterwards become polluted or damaged.

In order to always provide an intact and clean transport surface, a transport web not closed upon itself can be used which, on the one side, is unwound from an unwinding roller and, on the other side, is wound on a winding, or take-up, roller. Between the two rollers is located a transport web part on which the substrate can be transported and printed. In a simple setup, the unwinding and winding roller each rotate in one direction, so that the part of the transport web located between the unwinding and winding roller moves in one direction too. In such a setup, a transport web part is used only once for transporting a substrate, also when, during use, it does not become damaged or polluted. In order to prevent unnecessary use of transport web resulting from this, the winding and/or the unwinding roller can be rotated back if it is determined that a used transport web part is suitable for reuse. US 2008-0034990-A1 thus discloses a screen print table of which the unwinding roller can be rotated back, while the winding roller winds the transport web up only in case the transport surface appears polluted or damaged. However, the frequent unwinding and winding of the same transport web part can lead to damage and derailing (i.e. running from the roller) of the transport web. This happens in particular in that a transport web part, once it has been unwound, and when, after use, it is wound on the unwinding roller again, does not always end up on the unwinding roller in exactly the original position and shape.

The present disclosure therefore contemplates providing a transport system which enables reuse of at least a part of a transport web not closed upon itself as transport surface without repeatedly winding and unwinding this part.

To this end, a transport table is disclosed, comprising a transport web; an unwinding roller for unwinding the transport web therefrom; a first return element; a second return element; a winding roller for winding the unwound transport web thereon; a first frame with which the first and the second return element are connected; and a second frame with which the unwinding roller and the winding roller are rotatably connected, wherein the unwinding roller, the winding roller and the return element together are designed for stretching the transport web such that between the first and the second return element, a surface of the transport web is available as transport surface, and wherein the second frame is movable with respect to the first frame along a path substantially parallel to the conveying surface.

Such a transport table enables movement in at least two manners of a part of the transport web serving at a given time as transport surface.

In the first place, the transport surface can be moved by moving the unwinding roller and the winding roller together—by means of the second frame—with respect to the return elements connected to the first frame. Moving the second frame in a particular direction along the path can be accompanied by a movement of the transport surface in a direction opposite to this direction. By moving the second frame back and forth along the path, the transport surface can also be moved back and forth, so that the same transport web part can be used several times as transport surface before it is wound on the winding roller as a result of damage of pollution. The path along which the second frame moves is characterized in that the length of the stretched transport web therealong—i.e. the length of the transport web between the unwinding roller and the winding roller—is always constant. Therefore, as long as the second frame moves along the path, rotation of the unwinding and/or winding roller is not necessarily involved.

In the second place, the transport surface can be moved by, on the one side, unwinding transport web from the unwinding roller, and, on the other side, winding transport web on the winding roller. With this manner of moving of the transport surface, the rotation-allowing suspension of the unwinding roller and the winding roller in the second frame is of importance. The second manner moving the transport surface is preferably used when the part of the transport web serving as transport surface is no longer suitable for reuse.

In one embodiment of the transport table, the unwinding roller and/or the winding roller are braked with the aid of brake means.

Moving the second frame back and forth with respect to the first frame is accompanied by friction between the transport web and the return elements. To prevent, among others, this friction to inadvertently effect rotation of the unwinding roller and/or the winding roller, these rollers can be designed having brakes.

In another embodiment, the transport table comprises a drive unit for moving the second frame back and forth along the path with respect to the first frame.

In an industrial setting, moving the second frame back and forth along the path is preferably done in an automated manner, such as by means of a drive unit. The drive unit can engage the second frame and, when the first frame is secured with respect to the solid world, move the second frame with respect to the first frame.

In a further elaboration of the transport table, the second frame of the transport table is provided with a first engaging element, and the drive unit is provided with a second engaging element which is designed for uncouplable coupling with the first engaging element.

It can be advantageous to connect the drive unit to the transport table not in a fixed manner but in an uncouplable manner. As a result, it is possible, in particular, to combine a single drive unit with several combinations of first and second frames, with the second frames coupling for instance alternately or in succession with the drive unit. De facto, several transport tables can thus utilize one common drive unit.

The first and second frames of two or more transport tables can for instance be connected with a platform movable with respect to a common drive unit, such as a linearly movable or rotatable index table. Such an index table can be designed for moving the first and second frames of the transport tables along a number of stations, while at least one station is provided with a common drive unit with which a second frame of one of the transport tables couples when it is manoeuvred into the station by the index table.

In one embodiment of the transport table, the unwinding roller and the winding roller are connected to the frame such that the distance between the transport surface and a point on the outer circumference of the winding roller located at a maximum distance from the transport surface is always greater than the distance between the transport surface and a point on the outer circumference of the unwinding roller located at a maximum distance from the transport surface.

In another embodiment of the transport table, the unwinding roller and the winding roller are connected to the second frame such that the distance of a point on the outer circumference of the winding roller located at a maximum distance from the transport surface is always smaller than the distance of a point of the outer circumference of the unwinding roller at a maximum distance from the transport surface.

In order to enable simple replacement of the transport surface of the transport web, the unwinding roller and the winding roller can be connected with the second frame such that during a movement of the second frame at least one of the two rollers is engageable on an outer circumference by an element extending substantially parallel to the transport surface. Here, the outer circumference of the roller is understood to mean the outer dimension of the roller defined by the transport web wound on the roller. This can be realized by placing the rollers at mutually different (perpendicular) distances from the transport surface.

In the case the transport surface extends horizontally, and the unwinding roller and the winding roller are located beneath the transport surface, for instance one of the two rollers can be fastened lower than the other roller. As in such a configuration, driving a roller from beneath is simpler than driving it from above (the fact is that the transport web extends above the rollers) while preferably, the winding roller is driven to prevent pollution of the unwinding roller, in an advantageous embodiment of the transport table, the winding roller is placed lower than the unwinding roller, so that the winding roller is engageable on its outer circumference by an element extending horizontally. When, in an alternative embodiment, the unwinding roller is the roller placed lower, it should be taken into account that the outer diameters of the unwinding roller and the winding roller are variable. The fact is that when the transport table is in operation, the outer diameter of the unwinding roller becomes smaller according as more transport web is unwound, while conversely, the outer diameter of the winding roller becomes greater through winding up transport web. Therefore, the unwinding roller is to be fastened so much lower than the winding roller that the lowest point on an outer circumference of the unwinding roller remains always—i.e. independently of the changes occurring in operation in outer diameters of the two rollers—lower than the lowest point on an outer circumference of the winding roller.

In a further elaboration of the transport table, the drive unit further comprises a first rail extending along the path along which the second frame is movable, which first rail is movable back and forth in a direction substantially perpendicular to said geometric plane between a first position and a second position, wherein the first rail in the first position does make rolling contact, and in the second position does not make rolling contact with the unwinding roller or the winding roller when the second frame is moved.

In order to replace the part serving as transport surface, on the one side, transport web can be wound from the unwinding roller, and, on the other side, transport web can be wound around the winding roller. To this end, both rollers can undergo rotation. However, the angle through which a roller is to be rotated for unwinding or winding a piece of transport web having a length of at least approximately the length of the transport surface depends on the variable outer diameter of the respective roller. Naturally, this outer diameter can be monitored, and a drive element connected to the roller can be controlled on the basis of the actual outer diameter for rotating the roller, but this is rather laborious. It is simpler to engage a roller on its outer circumference when it is moved with the second frame along the path. This may for instance be done by pressing a rail against the roller, in a manner such that sufficient friction occurs between the roller and the rail for rotating the roller when it is moved along the rail. When the second frame is moved along the path over a distance as great as the length of the transport surface, the roller rotates along its outer circumference over a distance which corresponds with this distance. As a result, thus, a piece of transport web having a length of the transport surface is unwound or wound. Preferably, the outer circumference of the winding roller, and not the outer circumference of the unwinding roller is brought into contact with the rail in order to prevent pollution of the transport web to be unwound.

In order to keep the transport web stretched, both the unwinding roller and the winding roller are to rotate. To this end, one single rail can suffice which engages the outer circumference of one single roller. When, for instance, the winding roller is rotated with the aid of the rail, the unwinding roller will follow automatically. In this case, it is wise to design the unwinding roller with a brake in order to maintain the stress in the transport web. Conversely, the unwinding roller too can be rotated with the aid of the rail, but in that case, the winding roller may have to be energized for restoring the tension in the transport web through by it. Another drawback in this design is that the transport web still to be used can become polluted through the frictional contact between the rail and the winding roller.

According to a further elaboration of the transport table, the drive unit further comprises a second rail extending along the path along which the second frame is movable, which second rail is moveable back and forth in a direction substantially perpendicular to said geometric plane between a first position and a second position, while the second rail in the first position does and in the second position does not make mechanical contact with a brake means associated with the unwinding roller or the winding roller, so that the brake means, with the second rail in the first position, substantially has no braking action and with the second rail in the second position, does have a braking action on the rotational movement of the respective roller.

As already noted hereinabove, the unwinding roller and the winding roller can be designed having a brake. The main purpose of the brake is to guarantee the stress in the stretched transport web and to prevent undesired rotation of the rollers, inter alia during movement of the second frame relative to the first frame. However, upon replacement of the transport web, rotation of the roller is desired. In order to then prevent unnecessary friction, it can be advantageous to disengage the brake means associated with the roller driven by means of the first rail. Disengaging the brake means preferably takes place at the same time as the first rail driving the respective roller, more in particular over the distance over which the respective roller is driven. To this end, a second rail can be used, also extending along the path along which the second frame is moved, which is driven concurrently with the first rail. The second rail can engage a contact point provided to that end of the brake means in question. The brake means will typically be a brake block resting on the (shaft of the) roller, which can be lifted through the interaction with the second rail.

In one embodiment of the transport table, it comprises a control unit designed for controlling the position of at least one of the second engaging element, the first rail and the second rail.

In an industrial setting, an automatically operated transport table is preferred. To this end, the transport table can be provided with a control unit for controlling the drive unit.

The control unit can be designed to position the engaging element periodically or upon incidental indication to that effect, and thus determine the position of a second frame of a transport table, in combination or not in combination with adjustment of the position of the rail.

In another embodiment of the transport table, it also comprises a sensor connected to the control unit for inspecting a surface of the transport web.

With the aid of the sensor, the control unit can determine whether the transport surface of the transport web is damaged or polluted to such an extent that it needs to be replaced. The sensor can be an optical camera, possibly in combination with image processing equipment.

Also disclosed is a method which comprises providing a transport table or apparatus according to the present invention; placing a substrate on the transport surface; performing an operation on the substrate; discharging the substrate by moving the second frame with respect to the first frame along the path; replacing the transport surface, periodically or upon incidental indication to that effect, through direct engagement of the rail on the transport web wound on the winding roller or unwinding roller, while the second frame is moved along the path.

The above-mentioned and other features and advantages of the present invention will be elucidated in the following on the basis of a few Figures.

BRIEF DESCRIPTION OF THE DRAWINGS

Corresponding parts are provided in the Figures with the same reference numerals.

DETAILED DESCRIPTION OF THE FIGURES

Figure 1:
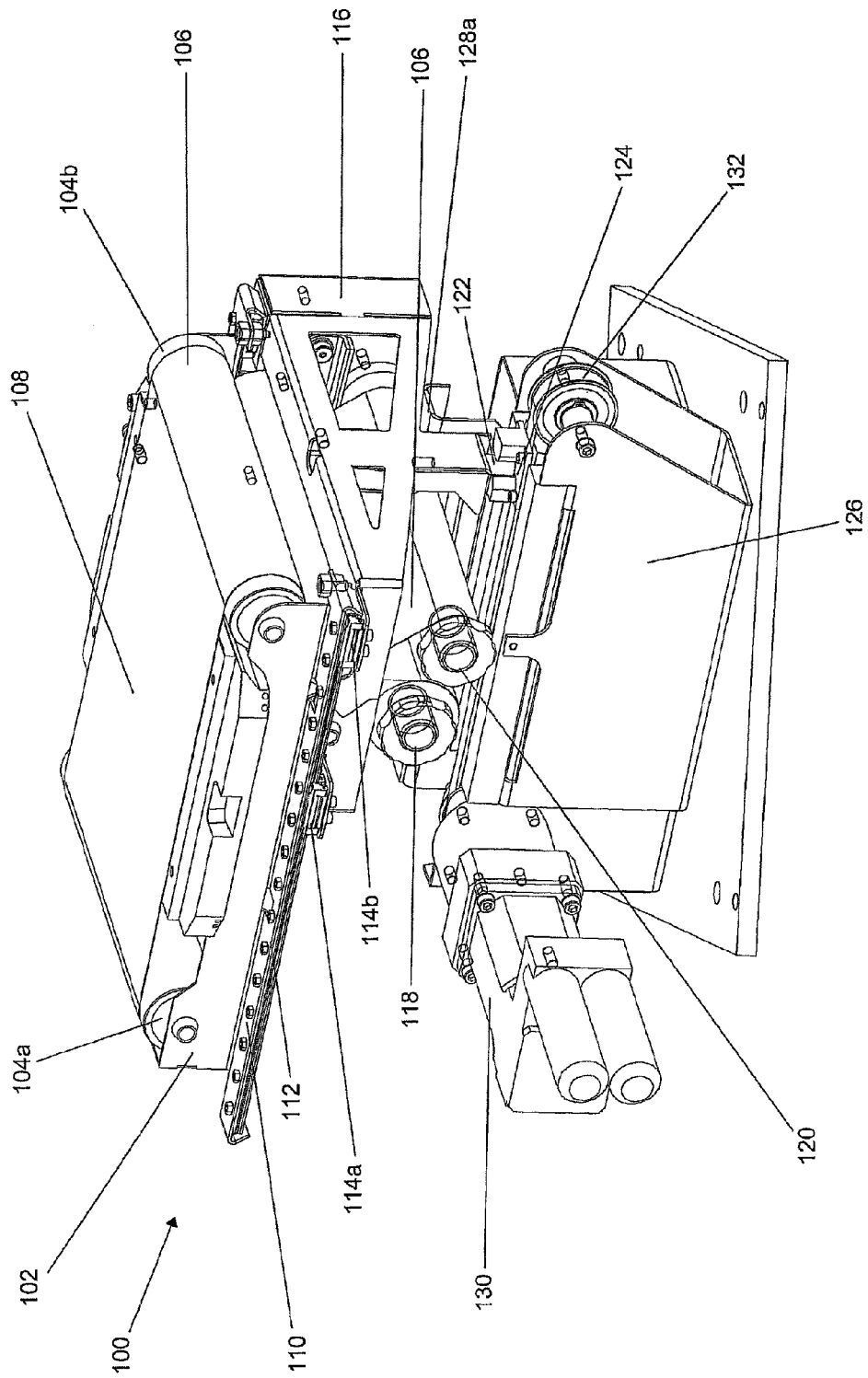
FIGS. 1-2 schematically show, in perspective view, an exemplary embodiment of a transport table according to the present disclosure.

FIG. 1 schematically shows in perspective view an exemplary embodiment of a transport table 100. For the sake of completeness and clarity, a similar transport table 100 is once more represented in different views in FIGS. 2-4. The transport table 100 comprises a first frame 102, in which two return elements 104a, 104b are included. The return elements 104a, 104b are designed in FIG. 1 as return pulleys rotatably connected with the first frame 102. However, non-rotatably mounted and/or non-cylindrical return elements can be used too, albeit that they may cause more friction than necessary with a transport web 106.

The first frame 102 is provided on both sides with a similar slide rail construction 110, by means of which the first frame 102 is connected to a second frame 116. The represented slide rail construction 110 comprises a guide rail 112 along which two running carriages 114a, 114b can be guided. These running carriages 114a, 114b bear the second frame 116, so that translation of the second frame 116 with respect to the first frame 102 is possible. Other constructions than the linear guide 110 shown for movably arranging the second frame 116 with respect to the first frame 102, such as, for instance, a telescopic guide, are also usable and known from practice.

To the second frame 116, an unwinding roller 118 and a winding roller 120 are connected. From the unwinding roller 118, a transport web 106 can be unwound, which extends via the first return element 104a and the second return element 104b to the winding roller 120. Between return elements 104a, 104b, a part of the transport web 106 is available as transport surface 108. The transport web 106 can be manufactured from paper, but other materials can also be utilized, such as washable materials which make the transport web 106 as a whole suitable for repeated use.

Figure 4:
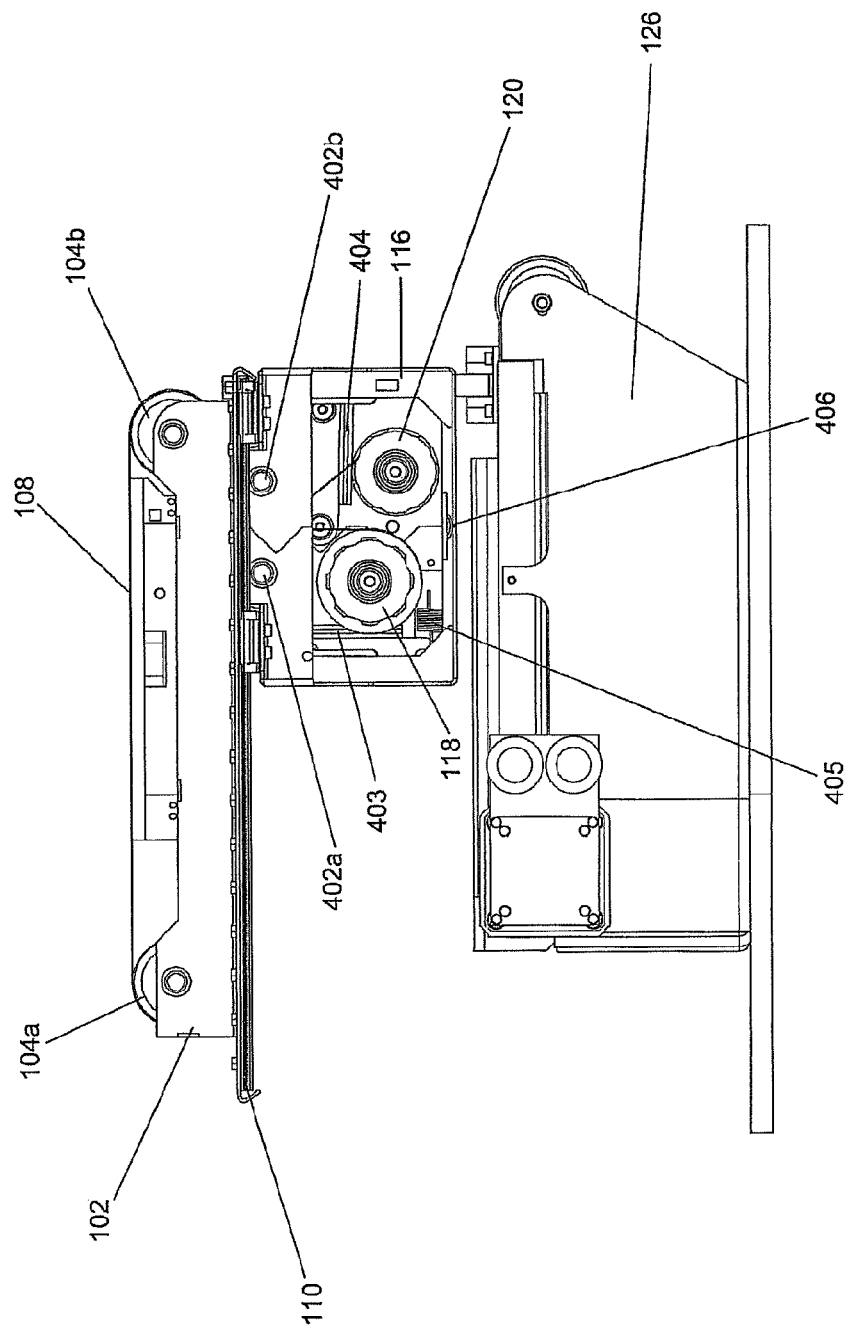

The unwinding roller 118 and the winding roller 120 can be braked, with the aid of brake means, to always guarantee some stress in the transport web. Brake means can include an intentionally stiff bearing mounting of the rollers 118, 120 or, for instance, a brake block engaging an outer circumference of a roller 118, 120. The side view of FIG. 4 shows, by way of illustration of a possible embodiment of the brake means, brake blocks 403, 404 which engage the outer circumference of the cylindrical shaft of roller 118 and 120, respectively. Therefore, the brake blocks 403, 404 do not engage the transport web wound about the shafts of the roller, but the shafts themselves, as is also clear from the Figures. With the aid of a spring 405 fastened between the second frame 116 and the brake block 403 and set under tensile stress, brake block 403 can be pressed on the shaft of roller 118, while brake block 404 can be brought, for instance through its own weight or through another spring (not shown), into frictional contact with the shaft of the winding roller 120.

In the embodiment of the transport table 100 shown in FIG. 1, an additional pair of return elements 105a, 105b (not visible in FIG. 1; see FIG. 7) is connected to the second frame 116 for guiding the transport web 106. The additional return elements 105a, 105b are identical to the return elements 104a, 104b and also rotatably mounted. The location of the additional return elements can be seen in the side view of FIG.

4, where the points of attachment of the return elements are indicated with reference numeral 402a, 402b. The additional return elements 105a, 105b are not essential as such for the functioning of the transport table, but do contribute thereto. Their function can be elucidated on the basis of FIG. 6 and FIG. 7.

Figure 6:
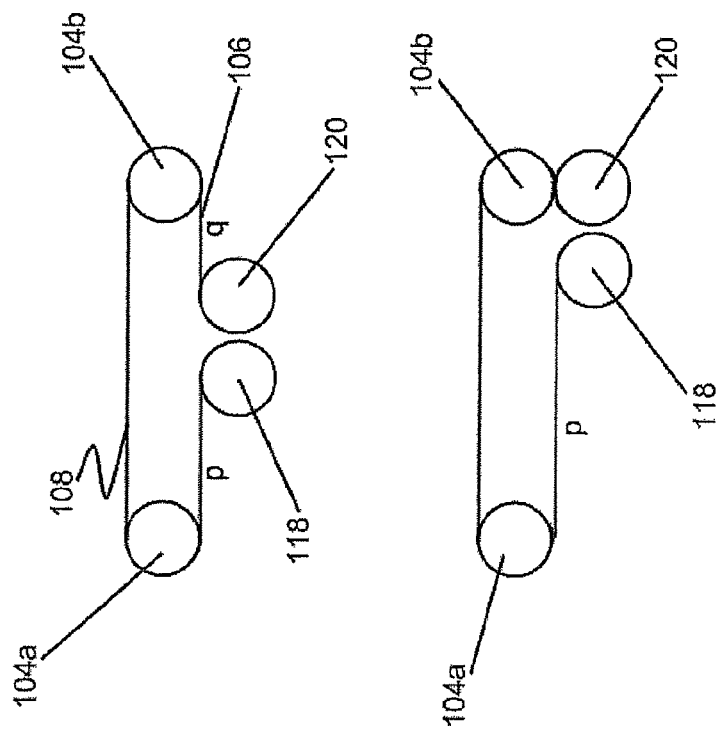
FIG. 6 schematically shows how unwinding rollers and winding rollers connected with the second frame can move relative to return elements connected to a first frame.

FIG. 6 schematically shows how a unwinding roller 118 and winding roller 120 connected to a second frame 116 (not shown in FIG. 6) can move return elements 104a, 104b connected with respect to the first frame 102 (not shown in FIG. 6). In the upper one of the two depictions, the second frame 116 is approximately halfway the path along which the frame is movable. This path is characterized in that movement of the second frame 116 with respect to the first frame 102 is possible without lengthening of the stretched part of the transport web 106 taking place. Herein, the length of the stretched part of the transport web 106 is understood to mean: the length of the transport web part which extends between the unwinding roller 118 and the winding roller 120. Owing to the limited length of the stretched part of the transport web 106, also, the length of the path is limited. The length of the stretched part of the transport web 106 can be conceived, in built-up condition, from three components: the constant length of the transport surface 108, the length of the transport web part between the unwinding roller 118 and the first return element 104a, indicated with p, and the length of the transport web part between the second return element 104 and the winding roller 120, indicated with q. In principle, the sum of these components is constant. Therefore, the second frame can move to the right only to the extent that the length p can increase at the expense of q. Upon movement to the left, the opposite applies. In the lowermost depiction of FIG. 6, the second frame has reached its extreme right position: here, q equals zero. Moving still further to the right would mean the increase of both p and q, and therefore lengthening of the stretched part of the transport web 106.

Figure 7:
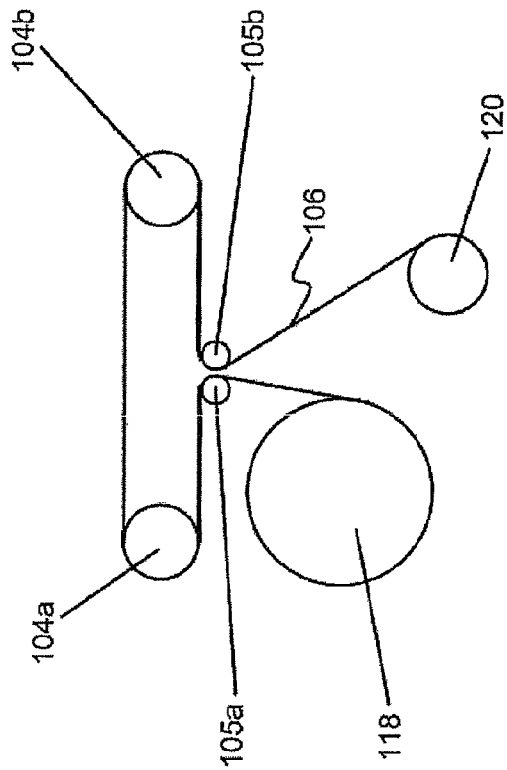
FIG. 7 schematically shows the use of an additional pair of return elements.

In FIG. 6, the real (variable) outer diameter of the unwinding roller 118 and the winding roller 120 have been left aside. In practice however, this outer diameter is of importance. Preferably, an unwinding roller 118 with a large supply of transport web to be unwound is mounted, therefore, a roller with a large outer diameter. However, rollers 118, 120 with a larger outer diameter are to be placed further apart to prevent mutual contact. As a result, the length of the variable component of the stretched transport web part (p+q) decreases, at least with respect to the length of the transport surface 108. This means that a substrate, placed on the transport surface 108 can be moved over a smaller distance. Therefore, the desire to use an unwinding roller 120 with a large outer diameter is, in a transport table 100 utilizing only two return elements 104a, 104b, as represented in FIG. 6, poorly compatible with the mobility of the transport surface 108. This problem can be solved by using an additional pair of return elements 105a, 105b, as schematically represented in FIG. 7. Together with the unwinding roller 118 and the winding roller 120, the return elements 015a, 105b can be connected to the second frame 116. The outer diameter of the return elements 105a, 105b can be selected independently. Here, a small outer diameter is naturally preferred.

Referring once more to FIG. 1, the transport table 100 shown further shows a drive unit 126. The drive unit 126 is provided with a drive element 130, in this case an electric motor, which is designed for driving a toothed belt 132. To the toothed belt is connected a second engaging element 124 which engages in an uncoupling manner a first engaging element 122 provided on the second frame 116. The first engaging element 122 is designed as a projection which, via a sideways movement, can be received between the two projections of the second engaging element 124. If desired, the first and second engaging element 122, 124 can be switched, or be replaced by alternative engaging elements. When the first frame 102 is fixed relative to the solid world, for instance through placement on a fixed index table, driving the toothed belt 132 enables movement of the second engaging element 124, and hence the second frame 116 along the slide rail 112 with respect to the first frame 102.

Figure 2:
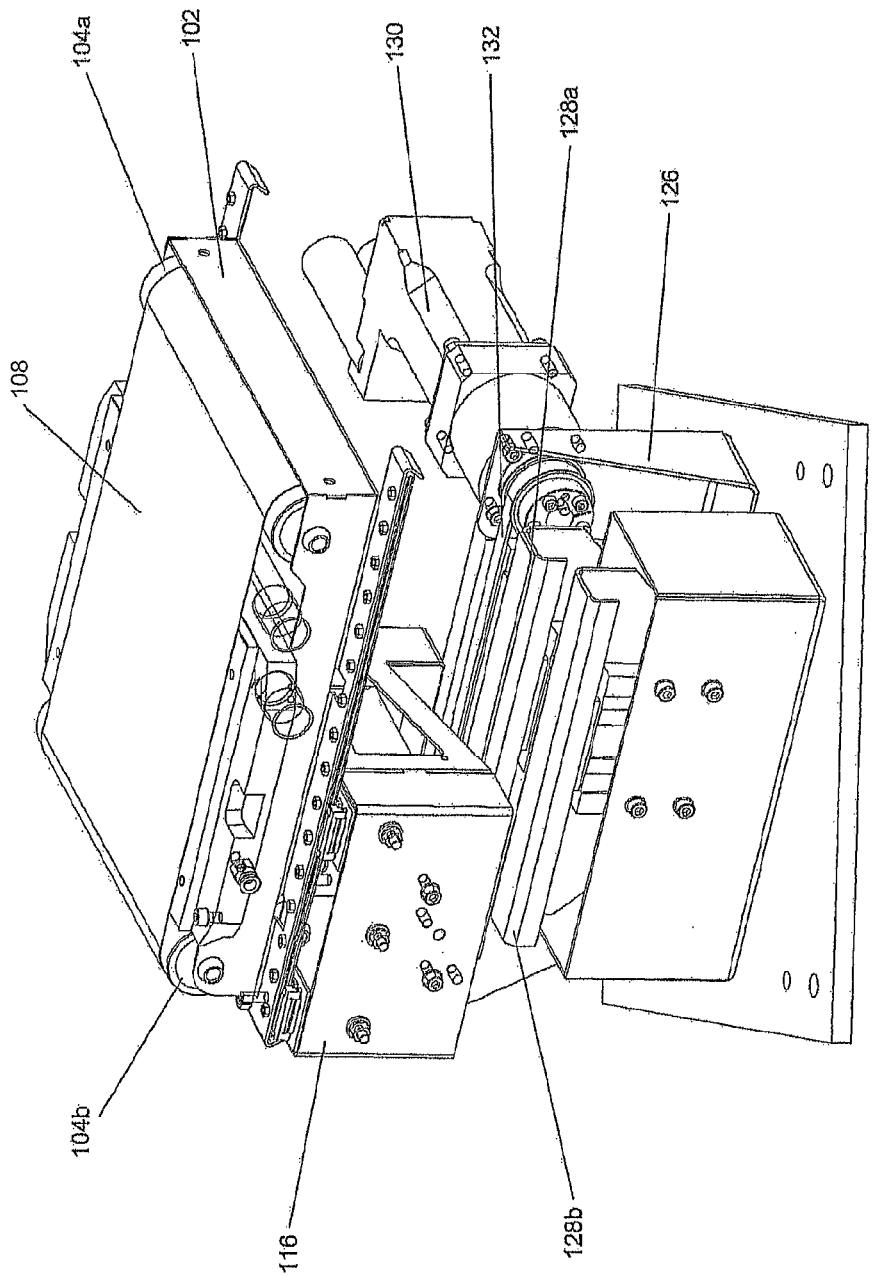
Figure 3:
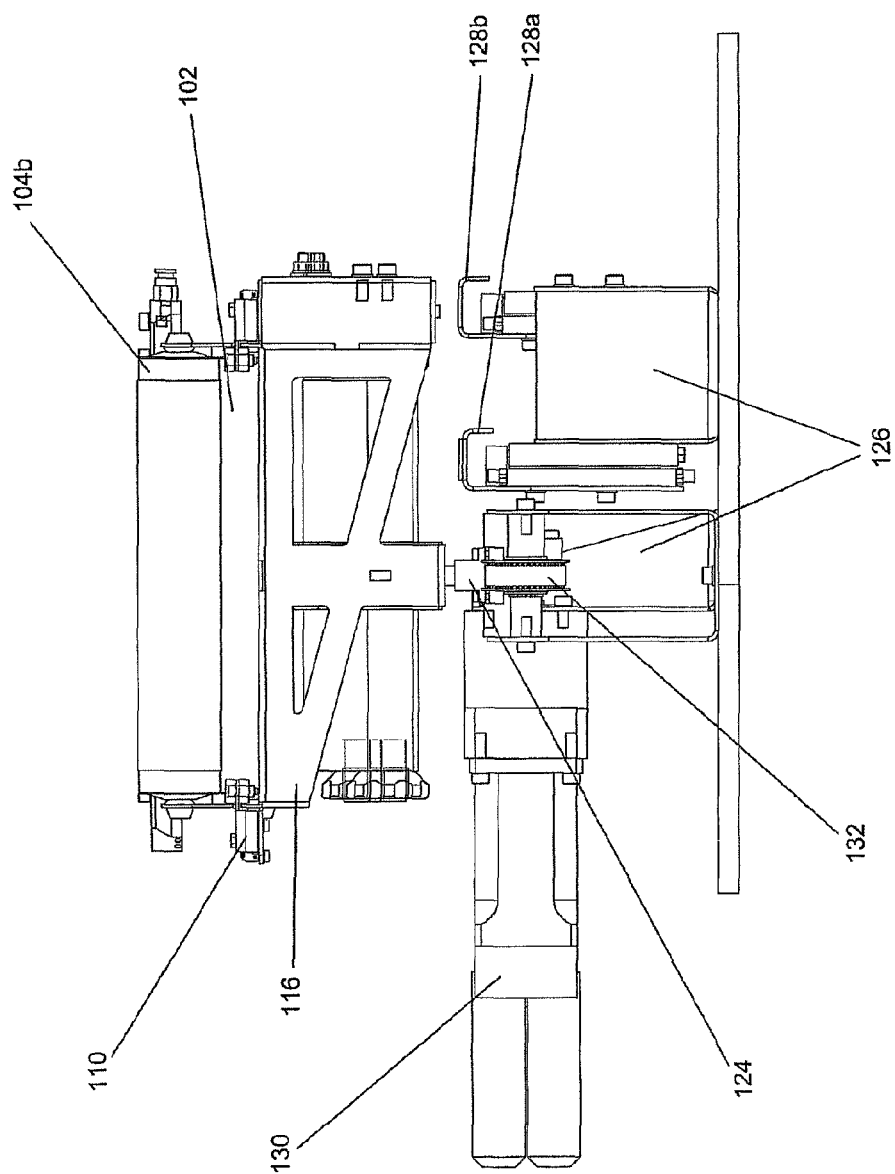
FIGS. 3-4 schematically show a front and a side view, respectively, of the transport table of FIGS. 1 and 2.

In FIG. 2 it more clearly visible than in FIG. 1 that the drive unit 126 is provided with two rails 128a, 128b, movable in vertical direction. As a rail, in principle, any elongated element can serve that can be provided along the path of the second frame 116. Rails 128a and 128b have separate functions. As already explained hereinabove, rails 128a can be brought into a first position to make contact with the outer circumference of winding roller 120. If, in this situation, the second frame 116 is moved, the winding roller 120 will make rolling contact with the preferably roughly designed contact surface of rail 128a, and rotate. Here, the transport web 106 is wound on the winding roller 120, while, owing to the stress in the transport medium, transport web 106 is unwound from the unwinding roller 118. All this amounts to replacement of the transport web part serving as transport surface 108.

Rail 128b, which just like rail 128a is movable substantially vertically between a first and a second position, makes no contact in its first position with the winding roller 120, but with a contact point 406 mechanically connected to the brake block 404. When rail 128 in its first position presses the contact point 406 upward, the brake block 404 resting on the shaft of the winding roller 120 is lifted. In principle, as a result, the winding roller 120 can rotate freely.

Naturally, the rails 128a and 128b are to be controlled in mutual connection. Preferably, the brake block 404 is lifted by rail 128b when the winding roller 120 is driven by rail 128a, and the brake block 404 is lowered on the shaft of the winding roller 120 when no driving takes place. Thus, unnecessary friction between the winding roller 120 and the brake block 404 during driving of the roller 120 is prevented, just like rotation of the winding roller 120 when no transport web needs to be replaced.

Figure 5:
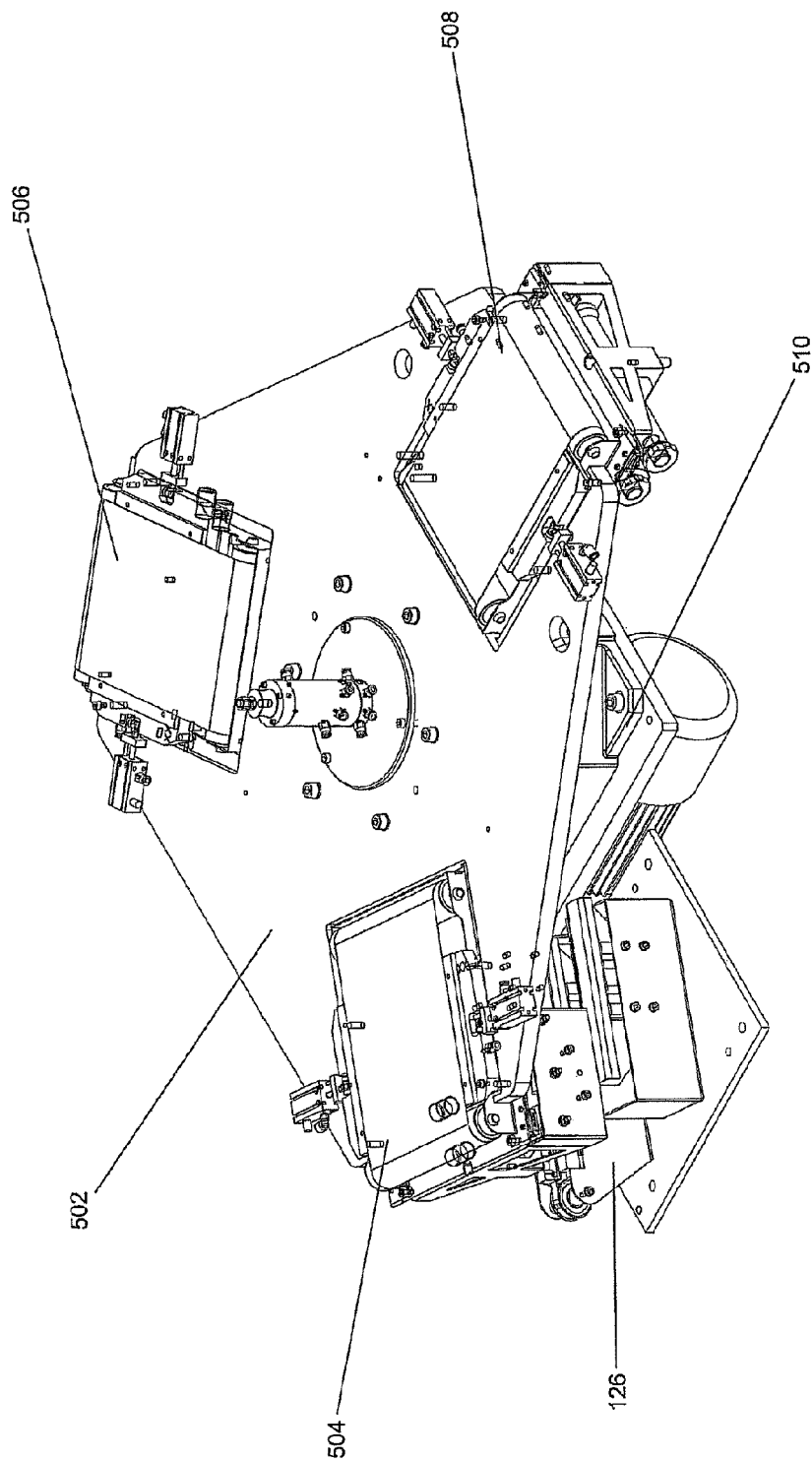
FIG. 5 shows a rotatable index table on which are fastened three transport tables, designed for cooperation with a common drive unit.

FIG. 5 shows an index table 502, rotatable about an axis with the aid of a drive element 510, on which table three transport tables 504, 506, 508 (at least the first and second frames thereof) are fastened. The three transport tables 504, 506, 508 share a common drive unit 126, with which each one of the tables is automatically coupled when they are manoeuvred into the position occupied by transport table 504 shown in FIG. 5. With the positions occupied in FIG. 5 by the different transport tables, stations in, for instance, a screen print process can be associated. For instance, in the station occupied by transport table 506, a substrate can be put on the transport surface of a transport table. Then, in the station occupied by transport table 508, this substrate can be printed whereupon, in the station occupied by table 504, it can be removed from the transport surface. This removal can take place by unwinding the substrate with the aid of a driven transport table onto a discharge conveyor (not shown). Here, of after this, the transport surface of the transport table can be inspected to see which action is desired: reuse or replacement of the transport surface. The mechanisms thereto are described hereinabove.

Although in the foregoing, the present invention is elucidated on the basis of a few exemplary embodiments, it should be noted that the invention is not limited to these exemplary embodiments. The skilled person can provide different modifications and changes to the discussed exemplary embodiments without, thereto, departing from the spirit and scope of the invention as laid down in the following claims. Here, in particular, different exemplary embodiments of the invention described hereinabove can be combined to form new embodiments.

The invention claimed is:

1. A transport table, comprising:
   a transport web;
   an unwinding roller for unwinding the transport web therefrom;
   a first return element;
   a second return element;
   a winding roller for winding thereon the unwound transport web;
   a first frame with which the first and the second return element are connected; and
   a second frame with which the unwinding roller and the winding roller are rotatably connected,
   wherein the unwinding roller, the winding roller and the first and second return elements together are designed for stretching the transport web such that between the first and the second return elements a surface of the transport web is available as transport surface, and wherein the second frame is movable with respect to the first frame along a path substantially parallel to said transport surface.

2. A transport table according to claim 1, further comprising a brake for braking the unwinding roller and/or the winding roller.

3. A transport table according to claim 2, further comprising a drive unit for moving the second frame along the parallel path with respect to the first frame.

4. A transport table according to claim 3, wherein the second frame of the transport table is provided with a first engaging element, and wherein the drive unit is provided with a second engaging element designed for uncouplable coupling to the first engaging element.

5. An apparatus comprising at least two transport tables according to claim 4, wherein the at least two transport tables have at least one drive unit in common, and wherein the first and second frames of the at least two transport tables are connected with a platform movable with respect to the at least one common drive unit.

6. An apparatus according to claim 5, wherein said platform is an index table rotatable about an axis, which index table is designed for moving the first and second frames of the at least two transport tables along a number of stations, and wherein at least one station is provided with the at least one common drive unit which is designed for cooperation with a respective second frame of one of the transport tables when it is maneuvered into the at least one station by the index table.

7. An apparatus according to claim 4, further comprising a control unit which is designed for controlling a position of the second engaging element.

8. A transport table according to claim 3, wherein the drive unit further comprises a first rail extending along the parallel path along which the second frame is movable, which first rail is movable back and forth in a direction substantially perpendicular to a plane of the transport surface between a first position in mechanical contact with the brake thereby allowing for rotational movement of the winding roller and/or the unwinding roller and a second position not in mechanical contact with the brake thereby applying a braking action to winding roller and/or the unwinding roller.

9. A transport table according to claim 8, wherein the drive unit further comprises a second rail extending along the parallel path along which the second frame is movable, which second rail is movable back and forth in a direction substantially perpendicular to the plane of the transport surface between a first position in mechanical contact with the brake thereby allowing for rotational movement of the winding roller and/or the unwinding roller and a second position not in mechanical contact with the brake thereby applying a braking action to winding roller and/or the unwinding roller.

10. An apparatus according to claim 9, further comprising a control unit which is designed for controlling a position of at least one of the first rail and the second rail.

11. An apparatus according to claim 10, further comprising a sensor connected to the control unit for inspecting at least the transport surface of the transport web.

12. A transport table according to claim 1, wherein the unwinding roller and the winding roller are connected to the second frame such that a distance between the transport surface and a point on an outer circumference of the winding roller located at a maximum distance from the transport surface is greater than a distance between the transport surface and a point on an outer circumference of the unwinding roller located at a maximum distance from the transport surface.

13. A transport table according to claim 1, wherein the unwinding roller and the winding roller are connected to the second frame such that a distance of a point on an outer circumference of the winding roller located at a maximum distance from the transport surface is smaller than a distance of a point located on an outer circumference of the unwinding roller located at a maximum distance from the transport surface.

14. A screen print apparatus comprising a transport table according to claim 1.

15. A method comprising:
    providing at least a transport table comprising a transport web; an unwinding roller for unwinding the transport web therefrom; a first return element; a second return element; a winding roller for winding thereon the unwound transport web; a first frame with which the first and the second return element are connected; and a second frame with which the unwinding roller and the winding roller are rotatably connected, wherein the unwinding roller, the winding roller and the first and second return elements together are designed for stretching the transport web such that between the first and the second return elements a surface of the transport web is available as transport surface, and wherein the second frame is movable with respect to the first frame along a path substantially parallel to said transport surface;
    placing a substrate onto the transport surface;
    performing an operation on the substrate;
    discharging the substrate by moving the second frame relative to the first frame along the parallel path; and
    replacing the transport surface periodically through direct engagement with the transport web wound on the winding roller or unwinding roller, while the second frame is moved along the parallel path.

16. A method according to claim 15, wherein the transport table further comprises a drive unit for moving the second frame along the parallel path with respect to the first frame, a brake associated with the winding roller and/or the unwinding roller, and a second rail extending along the parallel path along which the second frame is movable, the second rail being movable back and forth in a direction substantially perpendicular to a plane of the transport surface between a first position in mechanical contact with the brake thereby allowing for rotational movement of the winding roller and/or the unwinding roller and a second position not in mechanical contact with the brake thereby applying a braking action to winding roller and/or the unwinding roller; and wherein the method further comprises: moving the second rail from the second position to the first position so that the respective roller is rotationally driven by the drive unit.

* * * * *